Figure 8:
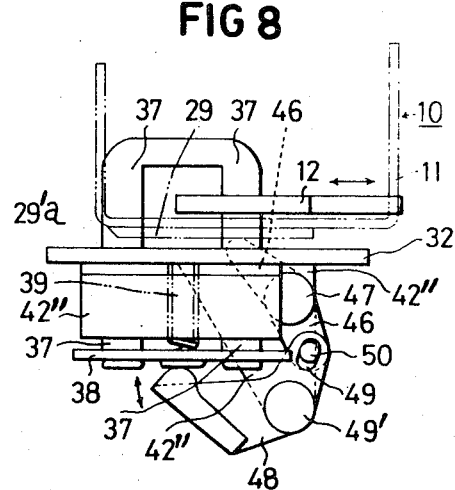

United States Patent [19]
Uemura et al.

[11] 3,727,960
[45] Apr. 17, 1973

[54] DOOR LOCKING MEANS FOR A VEHICLE

[75] Inventors: Masao Uemura; Kiyoshi Kumagai; Satoru Toyama, all of Nagoya, Japan

[73] Assignees: Kabushikikaisha Anseikogyo, Nagoya; Mitsubishijidoshakogyo Kabushikikaisha, Tokyo, Japan

[22] Filed: Oct. 27, 1971

[21] Appl. No.: 192,985

[52] U.S. Cl..............................292/216, 292/341.15
[51] Int. Cl..................................................E05c 3/26
[58] Field of Search.....................292/177, 138, 216, 292/335, 341.15, 341.16, 341.17

[56] References Cited

UNITED STATES PATENTS 3,056,619  10/1962  Fox et al..........................292/341.15

FOREIGN PATENTS OR APPLICATIONS 926,231  4/1955  Germany..............................292/138

*Primary Examiner*—Richard E. Moore
*Attorney*—William C. Linton et al.

[57] ABSTRACT

A door locking means comprising a latching means and a striker cooperative therewith including a striker rod usually retracted behind a base plate structure by means of a spring, a movable lever partly projecting through said base plate structure to be abutted by an abutting member of said latching means and a striker rod depressing lever pivoted on said base plate structure and pivotally connected to said movable lever.

6 Claims, 9 Drawing Figures

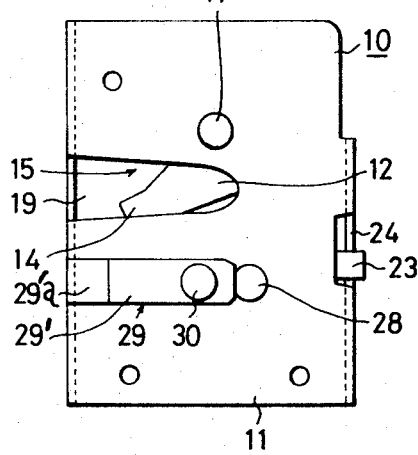
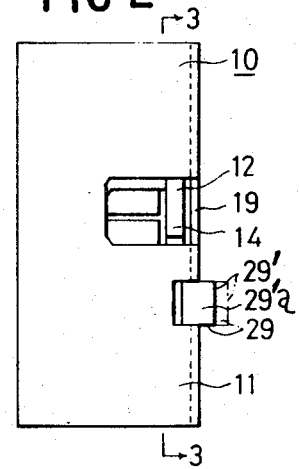
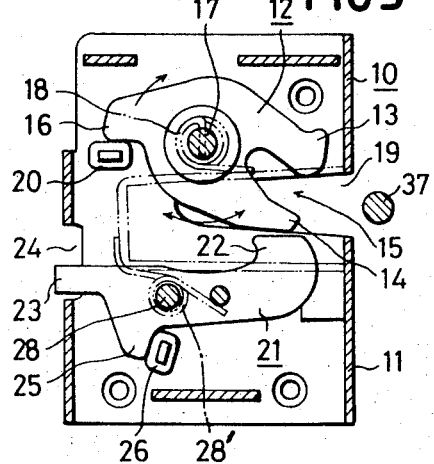
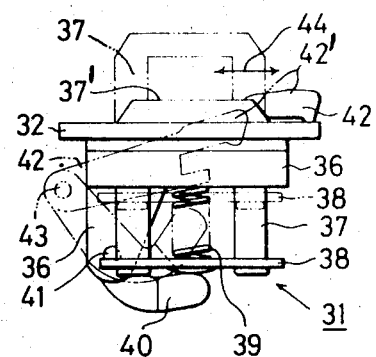

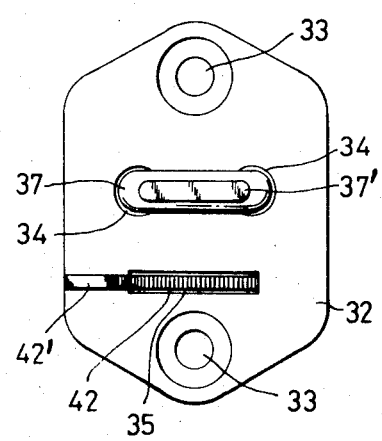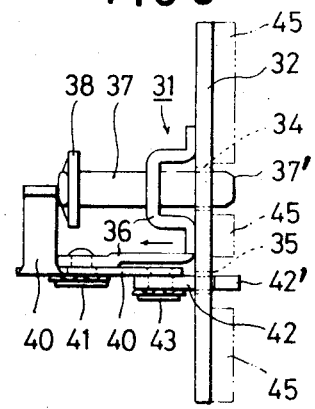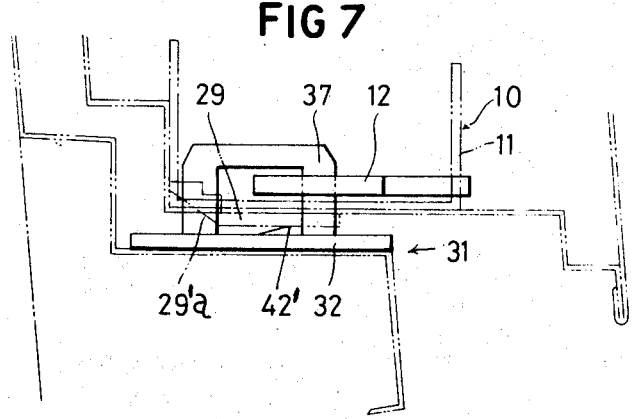

DOOR LOCKING MEANS FOR A VEHICLE

BACKGROUND OF THE INVENTION

This invention relates to door locking means for a vehicle such as an automobile and more particularly to an improvement of such striker of the door locking means that is attached to the body portion of the automobile confronting the end surface of the door of the automobile in its closed position.

In door locking means of this kind, a striker rod, which is adapted to engage with a latching member provided within a door structure near one end wall thereof, projects considerably beyond the end wall of the vehicle body forming an entrance portion, causing trouble such as tearing clothes of passengers or hurting the passenger. Even if the body of a driver or a passenger is not hurt, the striker rod, if applied with grease or the like lubricant, may contact the clothes of the passengers, spoiling them. In order to eliminate the shortcomings described above, it is, of course, possible to adopt door locking means including no striker rod. However, adoption of such door locking means makes the door locking means complicated, especially the latching mechanism thereof.

SUMMARY OF THE INVENTION

The door locking means according to the present invention is a combination of a striker attached on the end wall forming an entrance portion of the vehicle with a latching means disposed within the door structure confronting the striker. The striker comprises a base plate structure adapted to be attached on the end wall of the body and having an opening and a striker rod reciprocable through the opening and usually retracted substantially in the body structure behind the base plate by means of a spring, a movable lever partly projecting beyond the base plate structure and a striker rod depressing lever operably connected with the movable lever and with the striker rod. When the projecting portion of the movable lever is depressed by an abutting surface of an abutting member provided on the encasing structure of the latching means, the movable lever is shifted to cause the depressing lever to push out the striker rod beyond the base plate against the biasing force of the spring. When the striker rod is made disengageable from the latching member by operating a release lever of the latching means and the abutting surface ceases to depress the movable lever in a door opening operation, the striker rod is retracted again by spring biasing force behind the base plate.

Having described the salient relationship of the invention and the objects accomplished thereby it will be seen from the following description that a door locking means embodying the present invention can be provided with a usually retracted striker rod without requiring constructional complexity.

Figure 9:
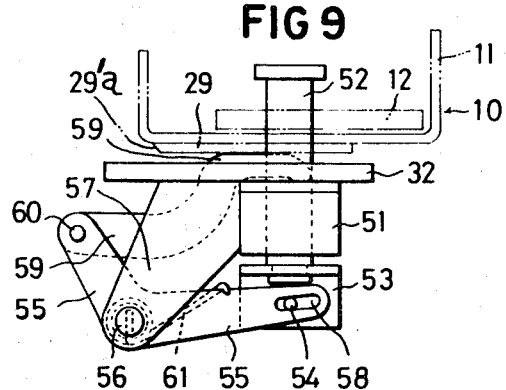

In the drawings:

FIG. 1 is a front elevational view of a latching means constituting an embodiment of the present invention, FIG. 2 is a side elevational view of the latching means shown in FIG. 1, FIG. 3 is a longitudinal section taken along line 3—3 in FIG. 2, FIG. 4 is a top plan view of a striker cooperating with the latching member shown in FIG. 1, FIG. 5 is a front elevational view of the striker, FIG. 6 is a side elevational view of the striker, FIG. 7 is a schematic view showing the engagement between a striker rod of the striker and a latching member of the latching means, FIG. 8 is a front elevational view showing another embodiment of the striker, and FIG. 9 is a front elevational view showing still another embodiment of the striker.

Referring to FIGS. 1-7, there is shown a latching means 10. In an encasing structure 11 of the latching means 10 a latching member 12 having a full-lock projection 13, a half-lock projection 14, a latching gap 15 formed by projections 13 and 14 and a stopper projection 16 is mounted rotatably on a supporting shaft 17 fixed to the encasing structure 11. A spiral spring 18 is mounted around the supporting shaft 17 so that it may bias the latching member 12 to a striker receiving position, namely in a counterclockwise direction. An opening 19 is cut out through the encasing structure 11 at a portion confronting the latching gap 15 in the striker receiving position. A stopper 20 is fixed on the encasing structure 11 to prevent excessive counterclockwise rotation of the latching member 12. A locking member 21 having a hook portion 22 of a form engageable with the half-lock projection 14 or the full-lock projection 13, a release lever 23 of a form to project through an opening 24 bored through the encasing structure 11 and a stopper projection 25 cooperating with a stopper 26 fixed to the encasing structure 11 to prevent unnecessary counterclockwise rotation of the locking member 21 is mounted on a supporting shaft 28 and is biased by a spiral spring 28' mounted between the locking member 21 and the encasing structure 11 in a counterclockwise direction. When the latching member 12 is in the striker receiving position, the hook portion 22 is positioned closely near the half-lock projection 14 and both the latching member 12 and the locking member 21 are prevented from further rotating in counterclockwise directions by the stoppers 20 and 26. An abutting member 29 made of plastic material is fixed to the external surface of the encasing structure 11 by means of a pin 30. The abutting surface 29' of the abutting member 29 has a tapered end surface 29'a for the easy depressing of a movable lever to be described hereinafter.

Next, a striker 31 is attached to the end wall of the vehicle body forming the entrance portion at such a position that the striker 31 can confront the latching means 10 when the door of the vehicle is closed. The striker 31 includes a base plate 32, mounting holes 33 for fixing the striker 31 to the body of the vehicle and circular openings 34 and a rectangular opening 35 for passing a striker rod to be described hereinafter and the movable lever respectively. A bracket 36 is fixed to the rear surface of the base plate 32 to be integral therewith. A U-shaped striker rod 37 is inserted in the circular openings 34 for free extraction and retraction. A stopper 38 is swaged on both ends of the U-shaped striker rod 37 and a spring 39 is mounted between the stopper 38 and the bracket 36 for biasing the striker rod 37 towards its retracted position. A L-shaped depressing lever 40 is supported rotatably by a pin 41 fixed to the bracket 36. A movable lever 42 pivotally connected by a connecting pin 43 to the depressing lever 40 is projecting through the opening 35 for free reciprocal displacement in a direction along an arrow 44. One end of the depressing lever 40 is so positioned as to be usually in contact with the stopper 38. In order to obtain an ornamental appearance and, a plastic planar member 45, which is provided with openings for passing the U-shaped striker rod 37 and the movable lever 42 and of a thickness equal to the length of the projecting portion of them, may be attached on the front surface of the base plate 32.

Modifications of the above described embodiment are now described referring to FIGS. 8 and 9 in which the same reference numerals designate similar members. In FIG. 8, a movable lever 46 is pivoted by a pivot 47 on the bracket 42'' and partly projects through an opening bored through the base plate 32. A depressing lever 48 is pivoted by a pin 49' on the bracket 42'' with one end thereof in contact with stopper 38 and with the other end connected to the movable lever 46 at an elongate hole 49 by a pin 50. In FIG. 9, a cylindrical guiding member 51 is fixed to the rear surface of the base plate 32 and a straight striker rod 52 slideably extends through the guiding member 51 and the base plate 32. To one end of the striker rod 52 is attached a connecting piece 53 provided with a stud 54. A depressing lever 55 is pivoted by a pin 56 on an arm 57 fixed to the rear surface of the base plate 32 and the stud 54 is inserted in an elongate hole 58 bored through one end portion of the depressing lever 55. A movable lever 59 is pivotally connected to the other end of the depressing lever 55 by a pin 60 and the other end portion of the movable lever 59 projects through the base plate 32. A spiral spring 61 is mounted around the pin 56 for biasing the depressing lever 55 to its retracted position.

The operation of the door locking means above described is as follows. When the door is going to be closed, the tapered end surface 29'a of the abutting member 29 on the encasing structure 11 attached to the end surface of the door abuts the projecting portion 42' of the movable lever 42 and the movable lever 42 is shifted along the direction indicated by the arrow 44. Accordingly, the depressing lever 40 connected to the movable lever 42 is displaced to a position shown by chain lines in FIG. 4, causing the striker rod 37 to project as shown in FIG. 7. The striker rod 37 thus projecting enters the latching gap 15 and rotates the latching member 12 against the spiral springs 18 and 28' in a clockwise direction until the engagement between the hook portion 22 and the full-lock projection 13 is attained whereby an unauthorized counterclockwise rotation is precluded. In this situation, the striker rod 37 is prevented from retracting away from the latching gap 15. Then, the full-lock projection 13 is disengaged from the hook portion 22 and the latching member 12 is in position to rotate in a counterclockwise direction by the biasing force of the spiral spring 18 if the striker rod 37 is retracted. When the abutting surface 29' ceases to abut the projecting portion 42' of the movable lever 42 in a door opening operation, the movable lever 42 returns to the position indicated by the solid lines in FIG. 4 and the depressing lever 40 returns to the original position, too. Thus, the striker rod 37 is retracted under the biasing force of the spring 39. Members such as 12 and 21 of the latching means 10 are returned to their original positions upon the striker rod 37 retracting from the latching gap 15. The operations of the strikers shown in FIGS. 8 and 9 are similar to that just described.

As is apparent from the above description, the striker rod 37 according to the present invention is held in the retracted position behind the base plate 32 when the door is opened and so the conventional shortcomings of spoiling or tearing clothes of passengers and hurting human bodies, for which a usually projecting striker rod is responsible can be eliminated completely, whereby the passengers can ride or descend from a vehicle more safely. Furthermore, because the striker of the present invention is cooperative with an ordinary latching means employed conventionally and the striker itself is not much constructionally complicated, the application of the present invention requires no such additional cost.

We claim:

1. A striker for a door lock comprising a base plate having at least two openings therethrough, a striker rod slideably extending through one of said base plate openings, a moveable lever extending through the second of said base plate openings and positioned for engaging a door frame member when mounted on a door, a depressing lever contacting an inner end of said striker rod, pivotally connected to said base plate and being linked to said moveable lever for being pivoted thereby to extend said striker rod from said base plate when said moveable lever engages a door frame member.

2. In a door locking means for a vehicle, a striker comprising a base plate structure having at least two openings, a striker rod slideably extending through one of said openings, a biasing spring mounted between said striker rod and said base plate structure tending to retain said striker rod retracted behind said base plate structure, a depressing lever pivotally mounted on said base plate structure and having an end in contact with said striker rod and a movable lever having an end portion pivotally connected to the other end of said depressing lever and a second end portion extending through a second of said base plate structure openings and positioned for engaging a doorframe member when in use whereby said striker rod will be extended from said base plate structure.

3. In a door locking means as claimed in claim 2 wherein said depressing lever has an L-shape with the base leg thereof contacting the inner end of said striker rod and the second leg being pivotally connected to said base plate structure and said movable lever.

4. In a door locking means as claimed in claim 2 wherein said moveable lever is pivotally connected to said base plate structure, a pin is mounted on the inner end portion of said moveable lever, said depressing lever has a slot in its other end with said pin slideably positioned therein providing the pivotal connection between said levers.

5. A striker for a door lock as claimed in claim 1 wherein said striker rod has a plate on its inner end, a pin on said plate, said depressing lever having an inner end slot with said pin slideably positioned therein and resilient means tending to retain said depressing in a position retracting said striker rod and said moveable lever relative to said base plate.

6. In a door locking means for a vehicle as claimed in claim 2 including latching means for engaging with said striker rod.

* * * * *

UNITED STATES PATENT OFFICE
CERTIFICATE OF CORRECTION

Patent No. 3,727,960      Dated April 17, 1973

Inventor(s) Masao Uemura et al.

It is certified that error appears in the above-identified patent and that said Letters Patent are hereby corrected as shown below:

On the cover sheet insert:

[33]  Foreign Application Priority Data

Japan      106932/70      Oct. 28, 1970

Signed and sealed this 28th day of January 1975.

(SEAL)
Attest:

McCOY M. GIBSON JR.            C. MARSHALL DANN
Attesting Officer              Commissioner of Patents